United States Patent
Lunsford et al.

(10) Patent No.: US 6,982,962 B1
(45) Date of Patent: Jan. 3, 2006

(54) SYSTEM AND METHOD FOR SELECTING A NETWORK ACCESS PROVIDER USING A PORTABLE INFORMATION DEVICE

(75) Inventors: Eric Michael Lunsford, San Carlos, CA (US); Steve Parker, Centerville, UT (US); David Kammer, Seattle, WA (US); David Moore, Riverton, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/546,887

(22) Filed: Apr. 10, 2000

(51) Int. Cl.
*H04B 7/005* (2006.01)
(52) U.S. Cl. ...................... 370/278; 455/557
(58) Field of Classification Search ................ 370/278, 370/282, 461, 463; 455/426, 556, 557, 575
See application file for complete search history.

(56) References Cited

U.S. PATENT DOCUMENTS

| | | | | |
|---|---|---|---|---|
| 6,016,476 | A * | 1/2000 | Maes et al. ...................... 705/1 |
| 6,134,453 | A * | 10/2000 | Sainton et al. .............. 455/553 |
| 6,208,857 | B1 * | 3/2001 | Agre et al. .................. 455/428 |
| 6,232,970 | B1 * | 5/2001 | Bodnar et al. .............. 715/708 |
| 6,259,405 | B1 * | 7/2001 | Stewart et al. .............. 342/457 |
| 6,553,345 | B1 * | 4/2003 | Kuhn et al. .................. 704/275 |
| 6,571,221 | B1 * | 5/2003 | Stewart et al. ................ 705/52 |

OTHER PUBLICATIONS

Specification of the Bluetooth System, *"Wireless Connections Made Easy"*, Specification vol. 1, Dec. 1, 1999, pp. 1-1082.
Specification of the Bluetooth System, *"Wireless Connections Made Easy"*, Specification vol. 2, Dec. 1, 1999, pp. 1-440.

\* cited by examiner

*Primary Examiner*—Man U. Phan
*Assistant Examiner*—Toan Nguyen
(74) *Attorney, Agent, or Firm*—McDonnell Boehnen Hulbert & Berghoff LLP (57) ABSTRACT

A system and method for selecting a network access provider using a portable information device (PID) includes considering the user's pre-stated preferences. The pre-stated preferences may include, but are not limited to, reliability, security, signal strength, cost or appropriateness of service provider. The network access providers may be chosen from, but not limited to, a network access server at a corporate office or a cellular telephone. A score is calculated for each available network access provider and a connection is made based on the optimum provider that fits with the preferences of the user.

5 Claims, 7 Drawing Sheets

```
float device_score[ num_devices_discovered() ];

for (int i = 0, i < num_devices_discovered(), i++)
{
    device_score[i] = 0;

for( int j = 0; j < num_properties(); j++)
    {
        int prop_score = test_property_of_device( j /*property number*/, i /*device number*/)
        float normalized_score = normalizer( j /*property number*/, prop_score);
        float weighted_score = normalized_score * get_weight_for_property( j /*property number*/);
        device_score[i] = device_score[i] + weighted_score;
    }
} int prefered_device_number = 0;
float prefered_device_score = device_score[0]
for (int k = 1; k < num_devices_discovered(), k++)
{
    if( prefered_device_score < device_score[k] )
    {
        prefered_device_number = k;
        prefered_device_score < device_score[k];
    }
}
```

FIG. 7

SYSTEM AND METHOD FOR SELECTING A NETWORK ACCESS PROVIDER USING A PORTABLE INFORMATION DEVICE

COPYRIGHT AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This present invention relates in general to portable information devices. More specifically, it relates to a system and method for selecting a network access provider using a portable information device.

BACKGROUND OF THE INVENTION

As the use of portable information devices (PID) increases, reliance on PID's to provide optimum functionality does too. An example of a PID is a personal digital assistant (PDA), such as one of the Palm™ series of PDA's offered by Palm, Inc. The PID's include a variety of functionality, such as wireless phone or two-way radio functionality.

Typically the PID can access a data network, such as, for example, a local area network (LAN), a wide area network (WAN), or more typically, a collection of interconnected LANs and WANs, also known as the Internet using a network access provider. The network access provider can be accessed through a cellular telephone or through a computer network which essentially function as nodes to connect with a data network. The user of the PID typically has to choose between the network access providers prior to accessing the data network.

There is a need to simplify the user's experience of choosing a suitable connection to an optimum network access provider using a PID.

SUMMARY OF THE INVENTION

The present invention includes a system and a method for selecting a network access provider using a portable information device (PID). The system and the method of the present invention simplifies the user's experience by automating the selection process and in addition may be the connection process to a network access provider. The selection and perhaps eventual connection to a network access provider is based upon a user's pre-stated preferences such as, for example, security, reliability, signal strength, cost or appropriateness of service provider. The relative importance of the preferences to each user are also considered when selecting the network access provider. The service providers may be chosen from, but not limited to, a network access server at a corporate office or a cellular telephone.

In a preferred embodiment, the method of the present invention includes the user indicating a level of importance for each preference or criterion. The preferences or criteria as described before include, but are not limited to, security, reliability, signal level, cost and ownership. The level of importance represents a weight for each preference and may be stored as a value between 0 and 1. For certain criteria that cannot be normalized, such as, for example, cost, the user inputs minimum or maximum limit values that are used to define a normalization range. The method further includes a routine for evaluating each criteria, such as, for example, for the criterion cost, the routine first makes necessary measurements by getting cost estimates for the different network access providers and then evaluating the importance of the criterion.

The method further includes a PID performing an inquiry to find available devices that provide network access. The PID may follow the short-range radio link guidelines specified in the Bluetooth specification to perform an inquiry using the discovery protocol. The PID makes a connection with the devices to learn the device's user friendly name. The method of the present invention then includes the PID computing a value or a score for each device by first running the heuristic routines for all the preferences and then multiplying the weight of the preferences with the normalized value output by the heuristic routine.

The method then includes sorting the list of the devices based upon the scores. If the user has configured the PID to auto-connect to the best available device for the user, the PID then attempts to connect to the best available device (device with the highest score, for example) automatically. The PID moves down the list of the devices if it were unable to reach the first device or network access provider.

In an alternate embodiment, the PID may show the list of available devices to the user in a ranked order according to the calculated score. The user then selects which device to connect to using the rankings.

The foregoing and other objects, features and advantages of the system and method for selecting a network access provider using a PID will be apparent from the following more particular description of preferred embodiments of the system and method as illustrated in the accompanying drawings in which like reference characters refer to the same parts throughout the different views. The drawings are not to scale, emphasis instead being placed upon illustrating the principles of the invention.

BRIEF DESCRIPTION OF THE DRAWINGS

Preferred embodiments of the present inventions are described with reference to the following drawings, wherein.

DETAILED DESCRIPTION OF PREFERRED EMBODIMENTS

The present invention is directed to a system and a method for selecting a network access provider using a PID.

Figure 1:
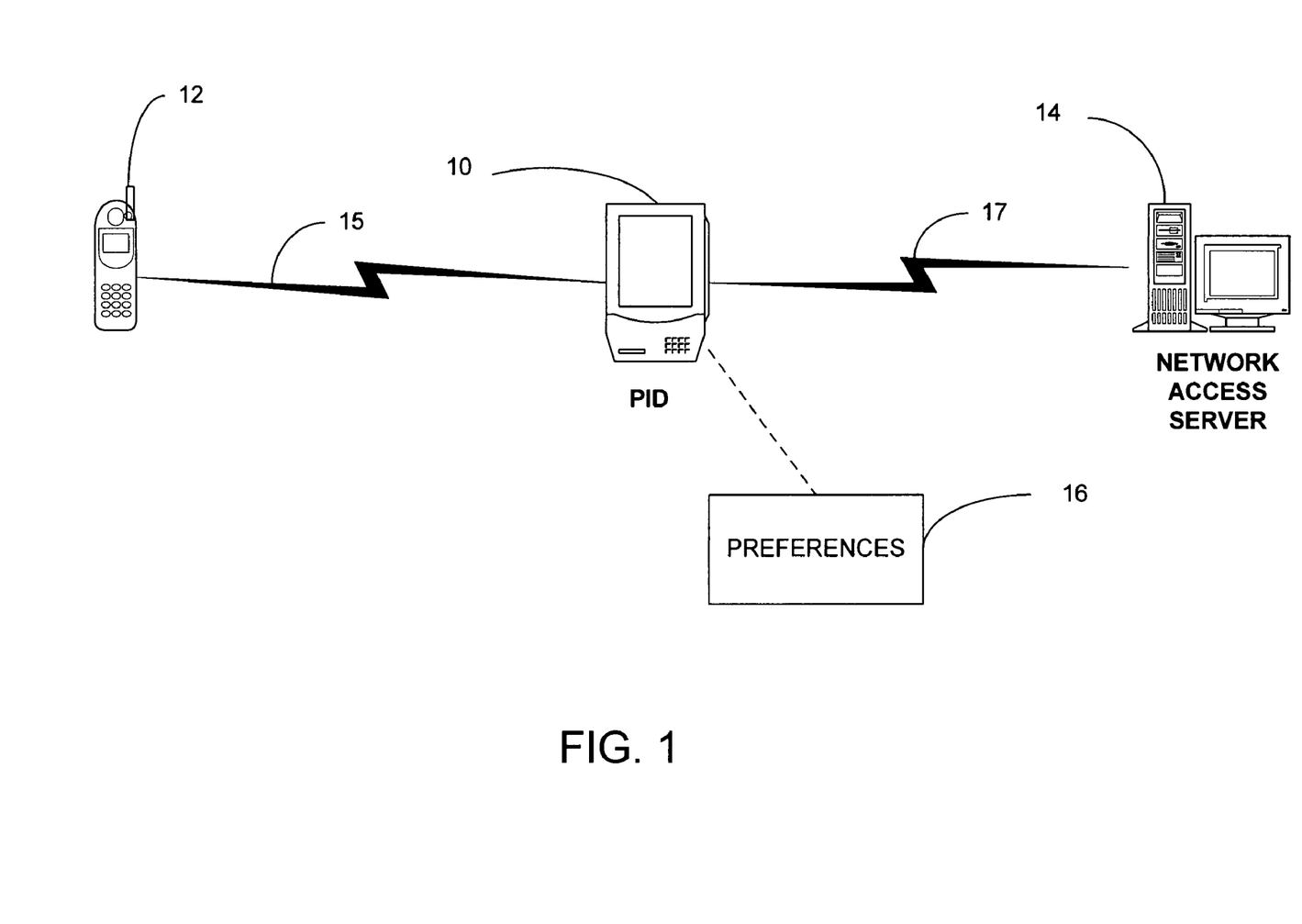
FIG. 1 is a block diagram illustrating a preferred embodiment of the system of the present invention.

FIG. 1 is a block diagram showing an exemplary embodiment of the system of the present invention. A PID 10 is able to interface with different network access providers such as, for example, a cellular telephone 12 and a network access server 14. The PID 10 and related devices may use a link, such as, for example, an RF link 15, 17 which may be implemented using all or parts of a specialized protocol, such as the Bluetooth system protocol stack. The PID 10 includes a list of user preferences 16 that the PID 10 uses to evaluate the different network access providers.

Figure 2:
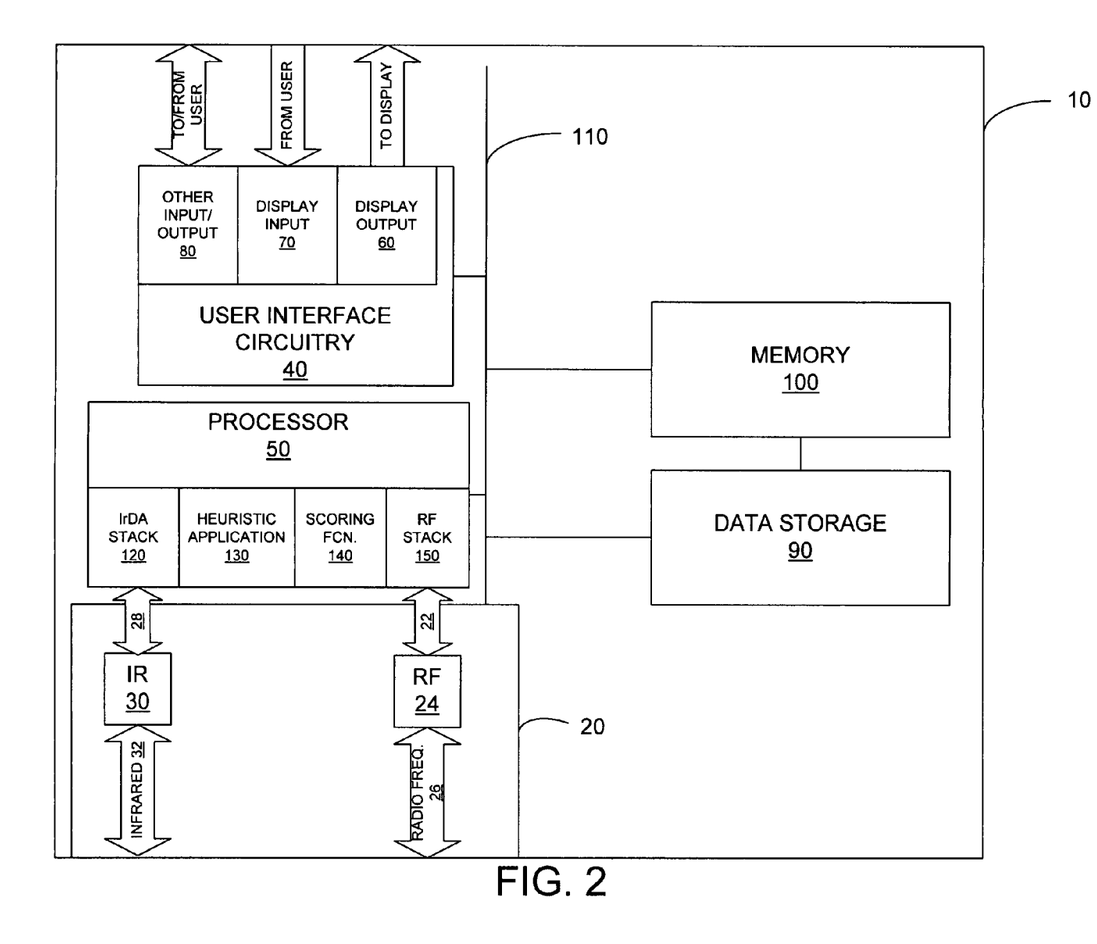
FIG. 2 is a block diagram illustrating a PID according to an exemplary embodiment of the present invention.

FIG. 2 is a functional block diagram showing an exemplary embodiment of the PID 10 that can communicate with network access providers. The link interface or data interface circuitry 20 illustrates, but is not limited to, two alternative link interfaces for establishing a wireless link to the network access providers. The wireless link 15, 17 is preferably an RF link as defined by the Bluetooth communications specification. However, the wireless link 15, 17 can take on other forms, such as, an infrared communications link as defined by the Infrared Data Association (IrDA). The PID 10 includes a processor 50 that is capable of executing an RF stack 150, and an IrDA stack 120 that communicate with a data interface circuitry 20 through bus 110. Processor 50 is also connected through bus 110 to user interface circuitry 40, data storage 90 and memory 100. The processor 50 also includes a heuristic application 130 which assists in calculating the scoring function 140 to determine the optimum network access provider.

Data interface circuitry 20 includes, in this exemplary embodiment, a first and second port, such as, an infrared and RF interface ports. The first wireless link interface, the RF link interface, may include a first connection 22 which includes radio-frequency (RF) circuitry 24 for converting signals into radio-frequency output and for accepting radio-frequency input. The RF circuitry 24 can send and receive RF data communications via a transceiver that establishes communication port 26. RF communication signals received by the RF circuitry 24 are converted to electrical signals and relayed to the RF stack 150 in processor 50 via bus 110. The radio interface 24, 26, and links 15, 17 between a PID and access provider devices may be implemented according to the Bluetooth specifications, described at www.bluetooth-.com, and incorporated in its entirety herein.

The second alternative wireless link interface may include a second connection 28, which further includes infrared circuitry 30 for converting signals into infrared output and for accepting infrared input. An infrared communication port 32 may also be included within the second alternative link interface. The infrared circuitry 30 can send and receive infrared data communications via a transceiver that establishes communication port 32. Infrared communication signals received by infrared circuitry 30 are converted into electrical signals that are relayed to the IrDA stack 120 in controller 50 via bus 110. The infrared circuitry 30 operates according to the IrDA specifications available at www.IrDA.org.

The two alternative link interfaces described above are merely exemplary, and additional means for implementing the interface between a PID and an access provider device may also be utilized. Although two link interfaces are shown in FIG. 2, there may be only one such interface in the PID 10. More than one link interface may be included to improve flexibility and to provide redundancy in case of failure of one of the link interfaces.

A user interface circuitry 40 includes hardware and software components that provide user input and output resources for functions in the processor 50. The user interface circuitry 40 includes a display output 60, a display input 70, and an additional input/output interface 80.

The display output 60 preferably receives digital information representing graphical data from the processor 50 and converts the information to a graphical display, such as text and or/images, for display on a display screen, for example.

The display input 70 may receive data inputs, such as graphical data inputs, from a user of the PID 10. The graphical data inputs are preferably entered by the user with a stylus on a pressure-sensitive display screen, and may include text, drawings, or other objects that are capable of being graphically presented.

The additional input/output interface 80 allows the user to enter other types of data besides graphical data into the PID 10. For example, audio data, additional graphical data, or additional input, such as video camera input for example, may be entered through the additional input/output interface 80. The data may also include data formatted for operation with particular applications on the PID 10. For example, email data, calendar data, contact data, database data, spreadsheets, notes, game data, etc may also be entered. Touch-sensitive screen buttons are an exemplary method for a user to enter control data into the PID 10.

The processor 50 may include an operating system, as well as application and communication software, to implement the functions of the PID 10. The operating system may be any suitable commercially available operating system, or any proprietary operating system. The operating system and software may be stored in the data storage 90, in the memory 100, or may be embedded in the processor 50. Although the processor 50 is shown connected to the data storage 90 through a bus 110, other configurations may also be used. Similarly, the memory 100 may be configured other than as shown in FIG. 2, and may be embedded within the processor 50.

Bluetooth is a short-range radio link intended to replace the cable(s) connecting portable and/or fixed electronic devices. Bluetooth technology features low power, robustness, low complexity and low cost. It operates in the 2.4 Ghz unlicensed ISM (Industrial, Scientific and Medical) band. Devices equipped with Bluetooth are capable of exchanging data at speeds up to 720 kbps at ranges up to 10 meters. It should be noted that higher power devices than typical Bluetooth enabled PIDs, such as, for example, a Network Access Point, may communicate via Bluetooth with an RF enabled PID over a greater range, such as, for example, approximately 100 meters.

A frequency hop transceiver is used to combat interference and fading. A shaped, binary FM modulation is applied to minimize transceiver complexity. A slotted channel is applied with a nominal slot length of 625 $\mu$s. For full duplex transmission, a Time-Division Duplex (TDD) scheme is used. On the channel, information is exchanged through packets. Each packet is transmitted on a different hop frequency. A packet nominally covers a single slot, but can be extended to cover up to five slots.

The Bluetooth protocol uses a combination of circuit and packet switching. Slots can be reserved for synchronous packets. Bluetooth can support an asynchronous data channel, up to three simultaneous synchronous voice channels, or a channel which simultaneously supports asynchronous data and synchronous voice. Each voice channel supports a 64 kb/s synchronous (voice) channel in each direction. The asynchronous channel can support maximal 723.2 kb/s asymmetric, or 433.9 kb/s symmetric.

The Bluetooth system consists of a radio unit, a link control unit, and a support unit for link management and host terminal interface functions. The link controller carries out the baseband protocols and other low-level link routines.

The Bluetooth system provides a point-to-point connection (only two Bluetooth units involved), or a point-to-multipoint connection. In the point-to-multipoint connection, the channel is shared among several Bluetooth units. Two or more units sharing the same channel form a piconet. One Bluetooth unit acts as the master of the piconet, whereas the other units act as slaves. Upto seven slaves can be active in a piconet.

The Bluetooth link controller has two major states: STANDBY and CONNECTION, in addition, there are seven substates, page, page scan, inquiry, inquiry scan, master response, slave response, and inquiry response. The substates are interim states that are used to add new slaves to a piconet.

The STANDBY state is the default state in the Bluetooth unit. In this state, the Bluetooth unit is in a low-power mode. The controller may leave the STANDBY state to scan for page or inquiry messages, or to page or inquiry itself. When responding to a page message, the unit enters the CONNECTION state as a slave. When carrying out a successful page attempt, the unit enters the CONNECTION state as a master.

In order to establish new connections the procedures inquiry and paging are used. The inquiry procedure enables a unit to discover which units are in range, and what their device addresses and clocks are. During an inquiry substate, the discovering unit collects the Bluetooth device addresses and clocks of all units that respond to the inquiry message. It can then, if desired, make a connection to any one of them. The inquiry message broadcasted by the source does not contain any information about the source. However, it may indicate which class of devices should respond. There is one general inquiry access code (GIAC) to inquire for any Bluetooth device, and a number of dedicated inquiry access codes (DIAC) that only inquire for a certain type of devices. A unit that wants to discover other Bluetooth units enters an inquiry substate. In this substate, it continuously transmits the inquiry message (which is an ID packet) at different hop frequencies. A unit that allows itself to be discovered, regularly enters the inquiry scan substate to respond to inquiry messages.

Figure 3:
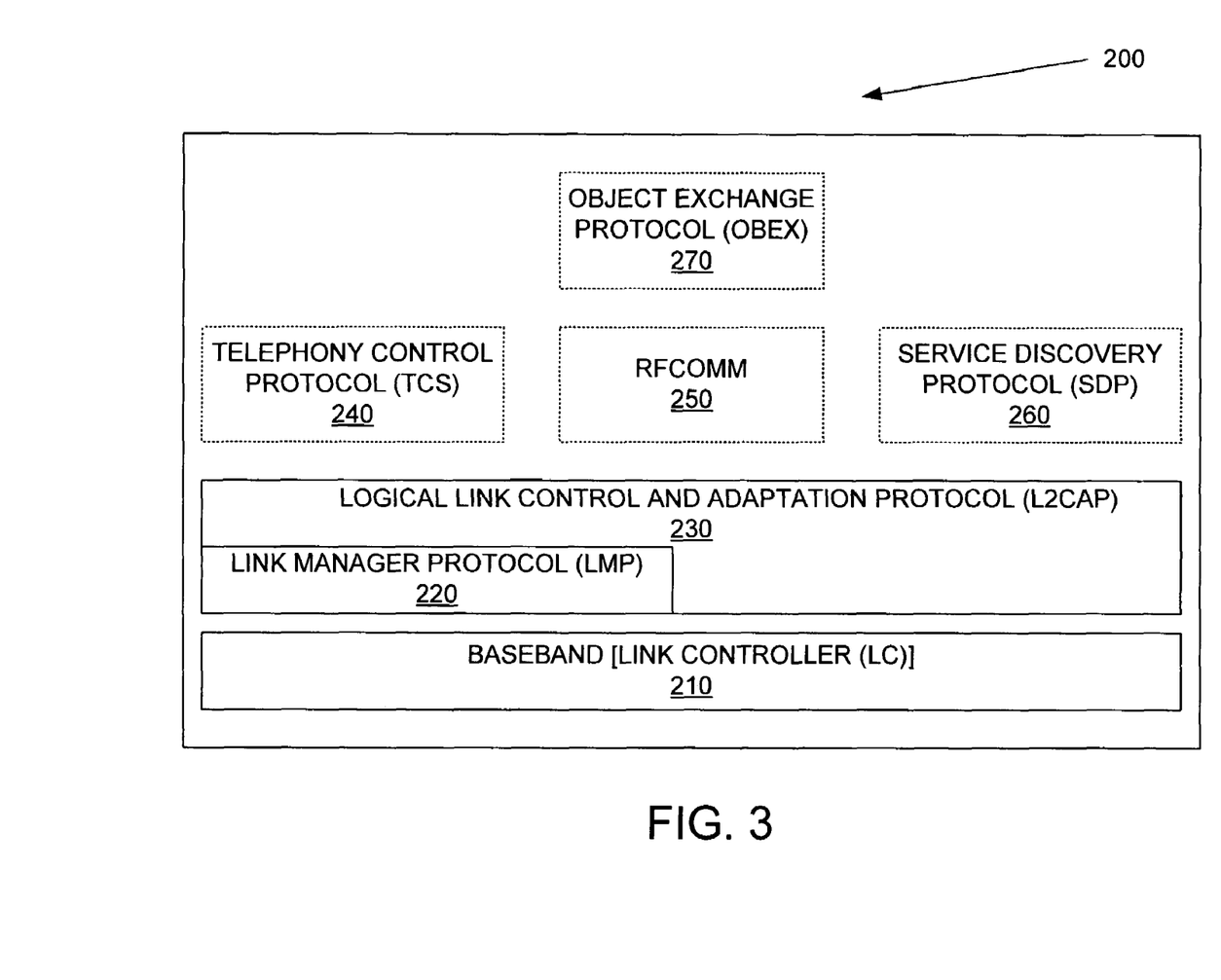
FIG. 3 is a stack layer diagram illustrating the layers of an RF protocol stack according to a preferred embodiment of the system of the present invention.

FIG. 3 is a protocol diagram 200 illustrating the layers of the Bluetooth (RF) protocol stack 150 that may be used in a preferred embodiment of the present invention. An RF protocol stack is implemented at each of the connection endpoints of an RF link. For example, a PID 10 and network access providers or devices as shown in FIG. 1, could each implement an RF stack to enable a link. The required layers of the RF link using the Bluetooth system are the Baseband layer 210, the Link Manager Protocol layer (LMP) 220, the Logical Link Control and Adaptation Protocol (L2CAP) layer 230, Telephony Control Protocol (TCS) layer 240, RFCOMM layer 250, Service Discovery Protocol layer 260 and Object Exchange Protocol (OBEX) layer 270.

Figure 4:
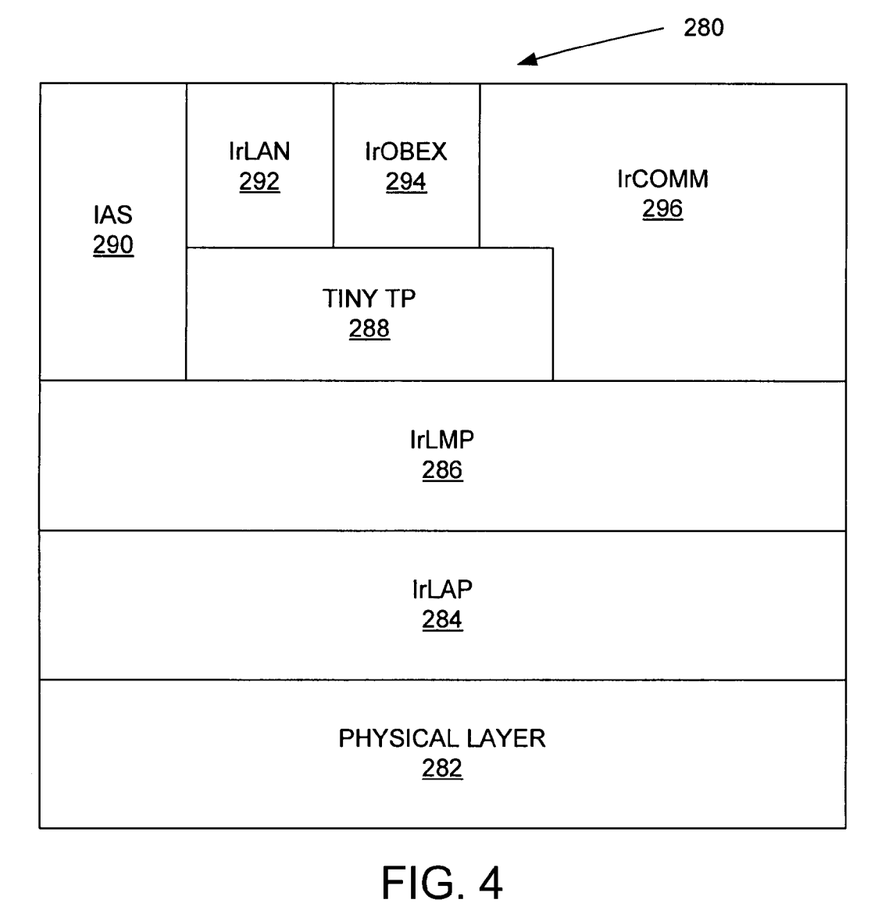
FIG. 4 is a stack layer diagram illustrating the layers of an infrared protocol stack according to a preferred embodiment of the system of the present invention.

FIG. 4 is a protocol diagram 280, illustrating the layers of the IrDA protocol stack 120 shown in FIG. 2. For example, the PID 10 and the cellular telephone 12 each implement an IrDA protocol stack to enable the link 15.

The required layers of an IrDA protocol stack 120 are the physical layers 282, the IrLAP layer 284, the IrLMP layer 286 and the IAS layer 290. The physical layer 282 specifies optical characteristics of the link, encoding of the data, and framing for various speeds. The IrLAP (Link Access Protocol) layer 284 establishes the basic reliable connection between the two ends of the link. The IrLMP (Link Management Protocol) layer 286 multiplexes services and applications on the IrLAP connection. The IAS (Information Access Service) layer 290 provides a directory of services on an IrDA device.

The IrDA protocol also specifies a number of optional protocol layers, these protocol layers being Tiny TP 288, IrOBEX 294, IrCOMM 296 and IrLAN 292. Tiny TP (Tiny Transport Protocol) 288 adds per-channel flow control to keep traffic over the IrDA link moving smoothly. IrOBEX (Infrared Object Exchange Protocol) 294 provides for the easy transfer of files and other data objects between the IrDA devices at each end of the link. IrCOMM 296 is a serial and parallel port emulation that enables existing applications that use serial and parallel communications to use IrDA without change. IrLAN (Infrared Local Area Network) 292 enables walk-up infrared LAN access for laptops and other devices. The use of the optional layers depends upon the particular application in the IrDA device. The IrDA protocol stack 120 is defined by such standard documents as "IrDA Serial Infrared Physical Layer Link Specification", "IrDA 'IrCOMM': Serial and Parallel Port Emulation over IR (wire replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at www.irda.org/standards/specifications.asp and is incorporated in it's entirely by reference herein.

Typically, PIDs, such as, the Palm Pilot, and the cellular telephone, already have an IrDA stack implemented in them to support their infrared link to other devices and the benefits of the IrDA stack are already available. Similarly, many personal computers and laptops are equipped with an IrDA stack and infrared port to communicate with peripheral devices, such as, printers. Therefore, it may be simply a matter of implementing the method of the present invention in order to obtain the benefits of the present invention.

Figure 5:
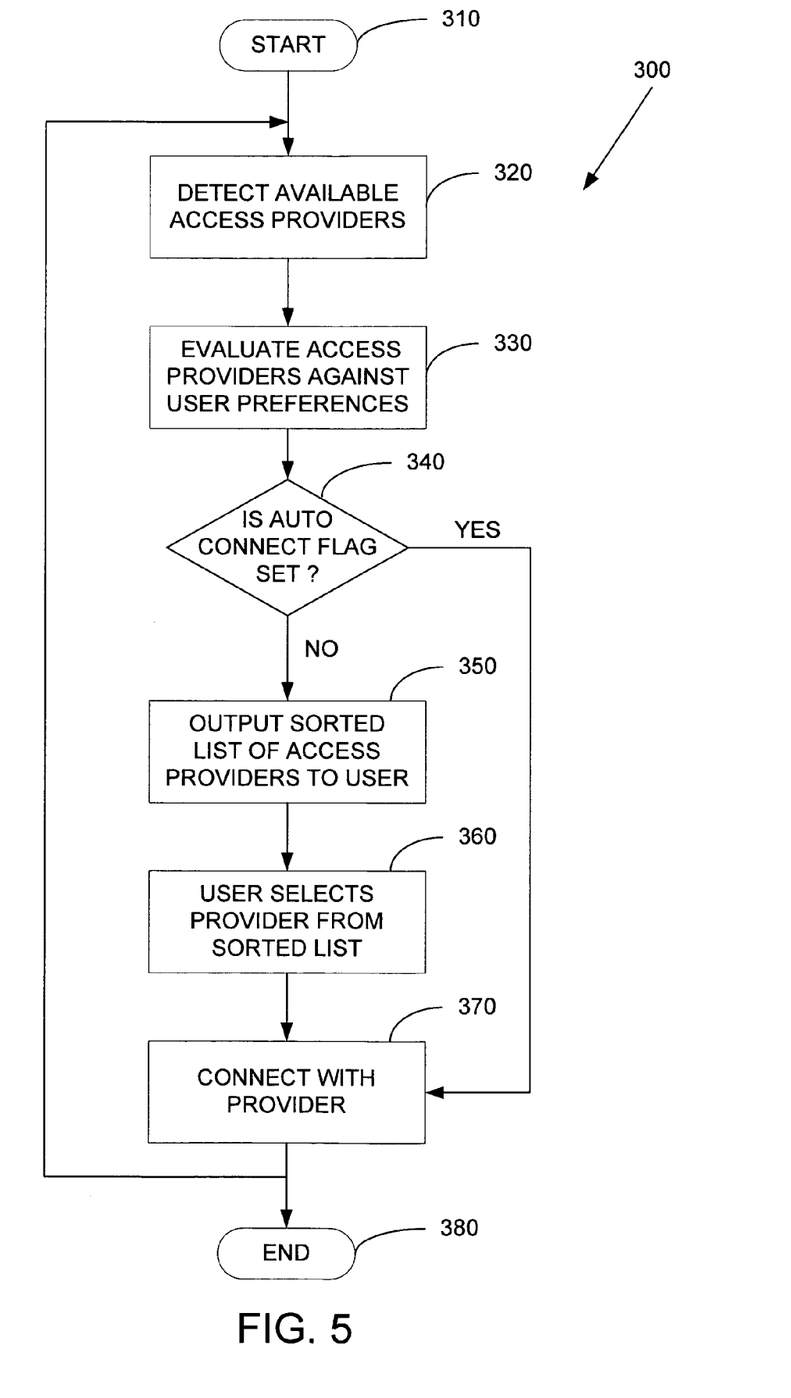
FIG. 5 shows a flowchart illustrating the method of a preferred embodiment of the present invention.

FIG. 5 is a flowchart illustrating a method of a preferred embodiment in accordance with the present invention. The process 300 to connect to a network access provider starts at step 310. At step 320, the PID detects available network access providers. The PID may use the Bluetooth discovery protocol to perform an inquiry to find available devices of a given class. The PID may have to connect to each discovered device in order to learn the device's user friendly name.

The process then proceeds to step 330 at which step the PID evaluates the network access providers against a user's preferences. The evaluation process is described in detail with respect to FIG. 6. The evaluation process calculates a score for each device or network access provider and sorts the list of devices based upon the score.

At step 340, if the auto-connect flag is set, by which the user has configured the device to attempt to auto-connect to the best available device, then the process proceeds to step 370. At step 370, the PID attempts to connect to the best device available to use the services. If the connection fails, the PID then moves through the list in order and attempts to connect to the optimum device per the user's preferences.

However, at step 340, if the auto-connect flag is not set and the user does not want the PID to attempt to auto-connect, then the PID displays the sorted list of network access providers to the user per step 350. In the alternative, the rank order of the devices is displayed as a percentage. Further, in an alternate embodiment, the user may have the ability to select a given device to see the rankings of the individual heuristic, expressed, but not limited to, percentages. At step 360, the user then selects the device the PID needs to connect. The PID then connects with the selected provider at step 370. If disabled by the user, the process to connect to an appropriate provider ends at step 380 else it iterates to keep connecting to an optimum provider.

Figure 6:
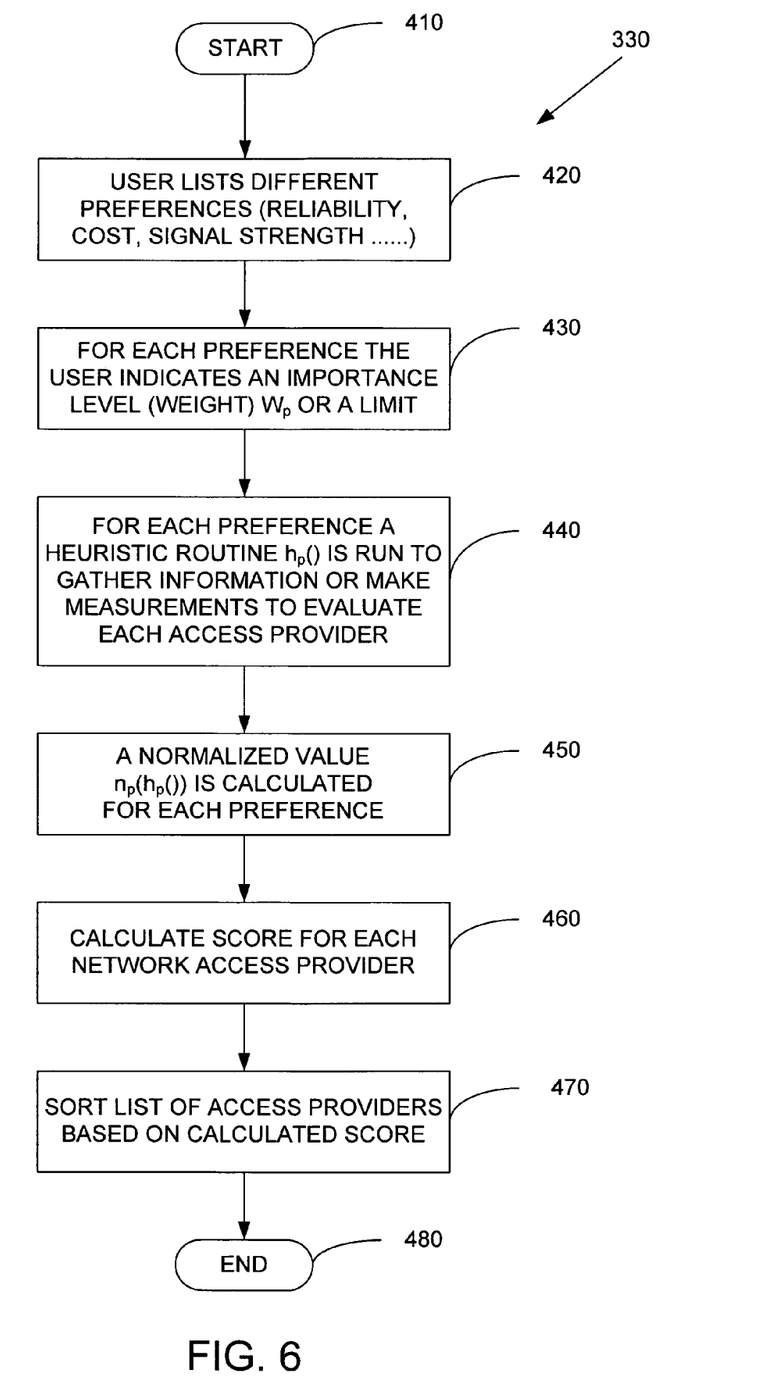
FIG. 6 shows a flowchart illustrating the method for evaluating the access providers in accordance with a preferred embodiment of the present invention.

FIG. 6 illustrates the process 330 to evaluate the access providers against a user's preferences for an optimum connection to a network access provider. The process 330 begins at step 410. The user inputs preferences or criteria that the PID processes to determine the optimum network access provider for the particular user, per step 420. The preferences include, but are not limited to, security, reliability of access, signal level, cost and ownership. The user additionally rates the importance of the preferences at step 430. For each preference, the user may, in a user interface implementation, configure a slider, for example, to indicate how important a particular preference is to the user. This assigned importance level is analogous to a weight and may be stored as a value between 0 and 1 and is referred to as the weight for the preference $W_p$. For preferences that cannot be normalized, for example, the criterion of cost that cannot be assured to fall within a certain range, the user inputs limit conditions. Thus, a minimum and maximum limit value can be used to define a normalization range. For example, the most amount the user is willing to pay per minute for Internet access.

At step 440, each preference or criteria has an associated heuristic routine or application as referred to in FIG. 2, which is a function for evaluating the preference and referred to as $h_p(\ )$ for each preference p. The heuristic application makes any measurements necessary to perform the evaluation. The measurements may include, but are not limited to, getting the cost from the devices or providers or radio signal strength. At step 450, each heuristic routine calculates a normalized value of $h_p(\ )$ which is referred to as $n_p(h_p(\ ))$. In the case when the value is non-normalizable, the routine uses the range specified by the limits input by the user as the normalization range. A value above and below the range is returned as, for example, infinity or negative infinity. At step 460, a score is calculated for each network access provider or device. The score for each device is calculated by summing the weighted score of each property.

Figure 7:
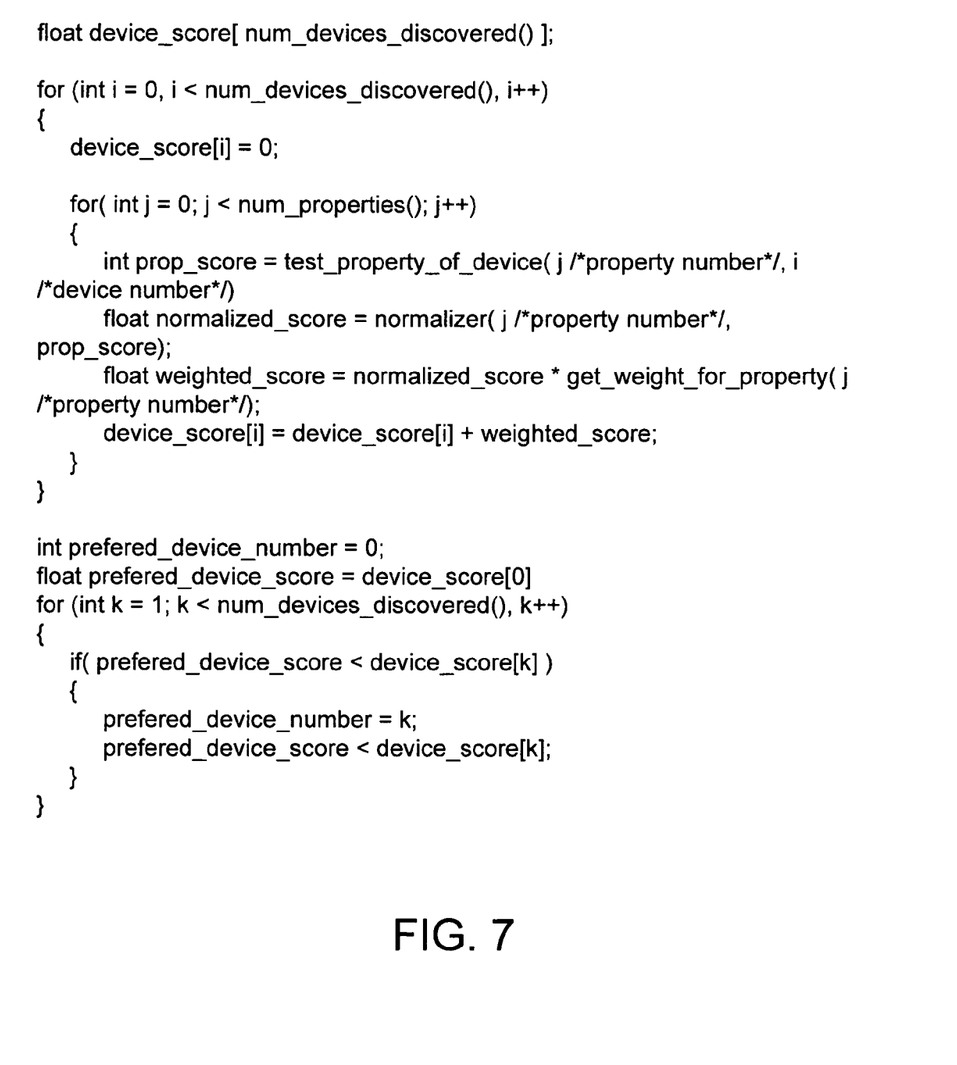
FIG. 7 is a listing of an exemplary functional code for calculating a score for different access providers in accordance with a preferred embodiment of the present invention.

FIG. 7 is an exemplary listing of functional code to calculate the device score. For each property or preference of a device, a normalized score or value $(n_p(h_p(\ )))$ is first calculated. A weighted score for each property is then calculated by multiplying each normalized score of a property $(n_p(h_p(\ )))$ with the weight of the property $(W_p)$. The device score $(S_d)$ in turn, is calculated by summing the weighted score for each of the properties (preferences) of the particular device.

Referring back to FIG. 6, at step 470, after computing score $(S_d)$ for each device, the PID sorts the list of the devices based upon the value of the device score, for example, the first device on the list has the highest score. If the device score of two or more devices is the same, the first one in the list is selected. The process 330 ends at step 480.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. In addition, protocols of various types are referenced throughout. While preferred and alternate embodiments may implement selected protocols, any suitable replacement protocol not mentioned, or any function not part of a protocol used to replace a corresponding function from a protocol may be implemented without departing from the scope of the invention. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for connecting to a data network access provider comprising:
    a portable information device wirelessly detecting and communicating with a plurality of available data network access provider devices;
    the portable information device evaluating the plurality of available data network access provider devices against a user's pre-stated preferences; and
    the portable information device connecting with at least one of the plurality of data network access provider devices based upon the user's preferences,
    wherein the step of the portable information device evaluating the plurality of available data network access provider devices further comprises:
    the user indicating an importance level for each pre-stated preference;
    the portable information device implementing a routine to gather the information about each pre-stated preference;
    the portable information device calculating a normalized value for each pre-stated preference; and
    the portable information device providing a rank for each of the plurality of data network access provider devices based upon a score for each pre-stated preference.

2. A portable information device for connecting to a data network access provider device comprising:
    an interface for receiving a user input;
    a wireless transmitter for transmitting a wireless message; and
    a controller coupled to the interface and the wireless transmitter, the controller being configured to execute a heuristic function and a score function to evaluate and select a device from a plurality of data network access devices in response to the user input; the controller being configured to format a wireless message in accordance with a predetermined protocol suitable for communication with the data network access provider device and wherein the controller outputs a wireless connection message to the wireless transmitter for transmission.

3. The portable information device of claim 2, wherein the wireless transmitter further comprises a radio-frequency transmitter and wherein the predetermined protocol further comprises a specialized radio-frequency protocol.

4. The portable information device of claim 2, wherein the wireless transmitter further comprises an infrared transmitter and wherein the predetermined protocol further comprises a specialized infrared protocol.

5. The portable information device of claim 2, wherein the user input comprises preferences which include at least one of cost, security, reliability, signal strength and appropriateness of service provider.

* * * * *